United States Patent [19]

Smith et al.

[11] Patent Number: 4,538,501
[45] Date of Patent: Sep. 3, 1985

[54] ELECTRONIC MUSICAL CHORD CALCULATOR

[75] Inventors: Raymond B. Smith, Preston; Brian F. Tranter, Lancashire, both of England

[73] Assignee: Speedyplain Limited, England

[21] Appl. No.: 366,273

[22] Filed: Apr. 7, 1982

[30] Foreign Application Priority Data

Apr. 7, 1981 [GB] United Kingdom ................ 8110775

[51] Int. Cl.³ .............................................. G09B 15/02
[52] U.S. Cl. ...................................................... 84/478
[58] Field of Search ............ 84/470 R, 470 A, 477 R, 84/478, 479 R, 479 A, 485 R

[56] References Cited

U.S. PATENT DOCUMENTS 4,054,868 10/1977 Rose ................................. 84/470 R
4,203,345 5/1980 Collin et al. ........................... 84/478
4,295,406 10/1981 Smith .............................. 84/470 R

FOREIGN PATENT DOCUMENTS 2049260 12/1980 United Kingdom ............. 84/470 R

Primary Examiner—William B. Perkey
Attorney, Agent, or Firm—William A. Drucker

[57] ABSTRACT

An electronic musical chord calculator suitable for embodiment using integrated circuitry, has finger-actuatable devices for specifying notes (13) and chords (14). A display (11) has indicator devices (12) for each note of any chord to be specified. Logic circuitry (m21) serves to produce one chord automatically and immediately. Other logic circuitry (m21) serves to produce other chords by logic operations to add or substract notes relative to the basic chord. Other embodiments produce all required chords for one note automatically and immediately, then produce chords for other notes by shift operations (29) from the chords for the one note.

18 Claims, 8 Drawing Figures

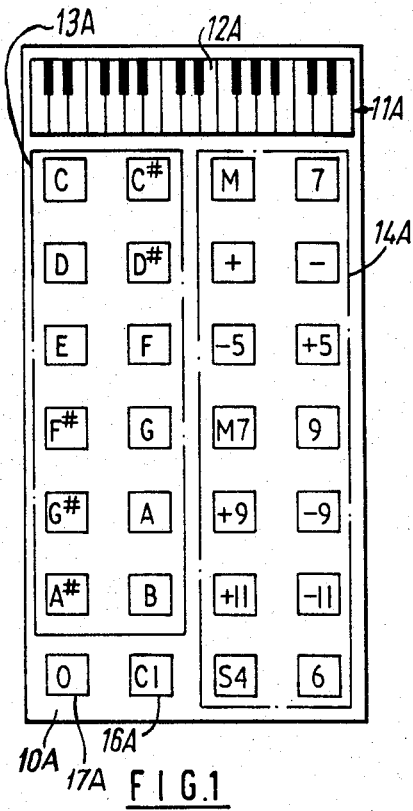
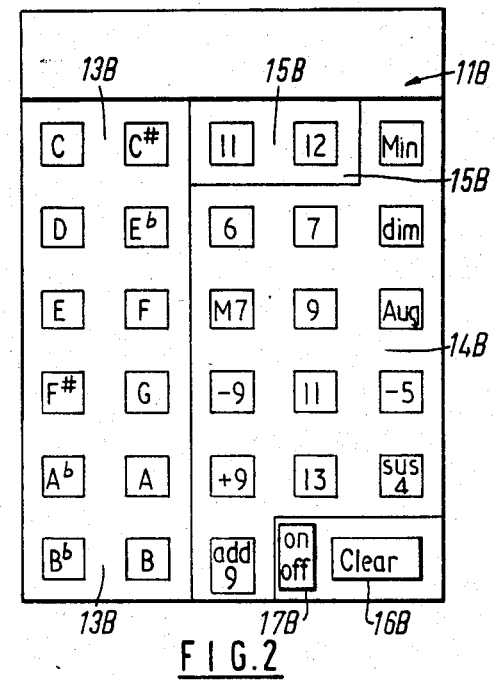
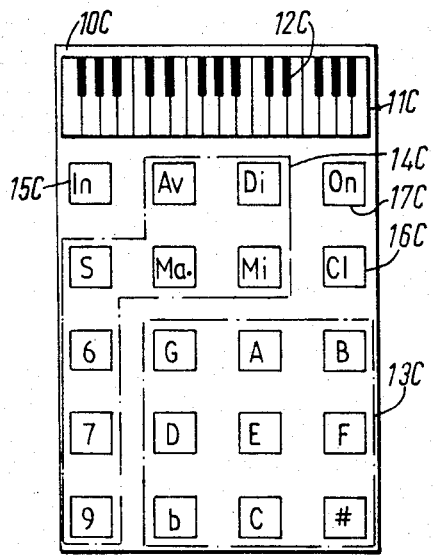
FIG.1
FIG.2
FIG.3

| Chord key | Notes Added | Notes Removed |
|---|---|---|
| Min | −3 | 3 |
| 6 | 6 | |
| 7 | −7 | |
| M7 | 7 | |
| Aug | +5 | 5 |
| dim | −3,−5,6 | 3,5 |
| Sus 4 | 4 | 3 |
| 9 | 2,−7 | |
| 11 | 2,4,−7 | |
| 13 | 2,4,6,−7 | |
| −5 | −5 | 5 |
| −9 | −2 | |
| +9 | −3 | |
| Add 9 | 2 | |
F I G. 4
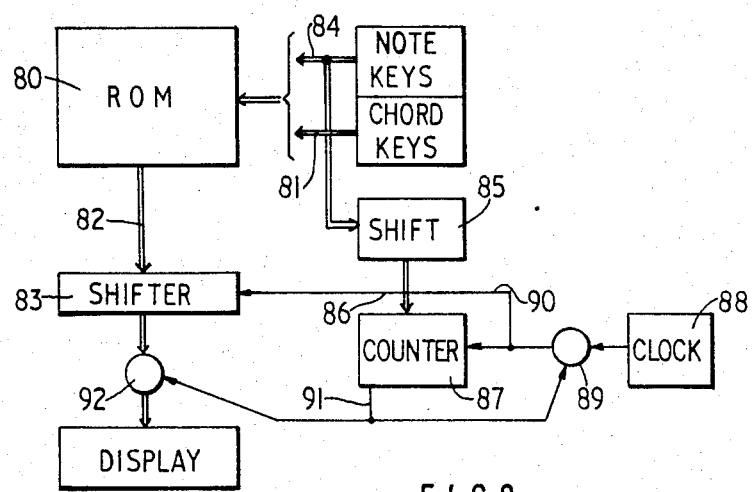
F I G. 8

DISPLAYED NOTES

| | Key | F | F# | G | Ab | A | Bb | B | C | C# | D | Eb | E | F | F# | G | Ab | A | Bb | B | C | C# | D | Eb |
|---|---|---|---|---|---|---|---|---|---|---|---|---|---|---|---|---|---|---|---|---|---|---|---|---|
| ROOT POSITION | C | | | | | | | | 1 | -2 | 2 | -3 | 3 | 4 | -5 | 5 | +5 | 6 | -7 | 7 | | | |
| | C# | | | | | | | | | 1 | -2 | 2 | -3 | 3 | 4 | -5 | 5 | +5 | 6 | -7 | 7 | | |
| | D | | | | | | | | | | 1 | -2 | 2 | -3 | 3 | 4 | -5 | 5 | +5 | 6 | -7 | 7 | |
| | Eb | | | | | | | | | | | 1 | -2 | 2 | -3 | 3 | 4 | -5 | 5 | +5 | 6 | -7 | 7 | |
| | E | | | | | | | | | | | | 1 | -2 | 2 | -3 | 3 | 4 | -5 | 5 | +5 | 6 | -7 | 7 |
| | F | 1 | -2 | 2 | -3 | 3 | 4 | -5 | 5 | +5 | 6 | -7 | 7 | | | | | | | | | | | |
| | F# | | 1 | -2 | 2 | -3 | 3 | 4 | -5 | 5 | +5 | 6 | -7 | 7 | | | | | | | | | | |
| | G | | | 1 | -2 | 2 | -3 | 3 | 4 | -5 | 5 | +5 | 6 | -7 | 7 | | | | | | | | | |
| | Ab | | | | 1 | -2 | 2 | -3 | 3 | 4 | -5 | 5 | +5 | 6 | -7 | 7 | | | | | | | | |
| | A | | | | | 1 | -2 | 2 | -3 | 3 | 4 | -5 | 5 | +5 | 6 | -7 | 7 | | | | | | | |
| | Bb | | | | | | 1 | -2 | 2 | -3 | 3 | 4 | -5 | 5 | +5 | 6 | -7 | 7 | | | | | | |
| | B | | | | | | | 1 | -2 | 2 | -3 | 3 | 4 | -5 | 5 | +5 | 6 | -7 | 7 | | | | | |
| 1st INVERSION | C | | | | | | | | -3 | 3 | 4 | -5 | 5 | +5 | 6 | -7 | 7 | 1 | -2 | 2 | | | | |
| | C# | | | | | | | | | -3 | 3 | 4 | -5 | 5 | +5 | 6 | -7 | 7 | 1 | -2 | 2 | | | |
| | D | -3 | 3 | 4 | -5 | 5 | +5 | 6 | -7 | 7 | 1 | -2 | 2 | | | | | | | | | | | |
| | Eb | | -3 | 3 | 4 | -5 | 5 | +5 | 6 | -7 | 7 | 1 | -2 | 2 | | | | | | | | | | |
| | E | | | -3 | 3 | 4 | -5 | 5 | +5 | 6 | -7 | 7 | 1 | -2 | 2 | | | | | | | | | |
| | F | | | | -3 | 3 | 4 | -5 | 5 | +5 | 6 | -7 | 7 | 1 | -2 | 2 | | | | | | | | |
| | F# | | | | | -3 | 3 | 4 | -5 | 5 | +5 | 6 | -7 | 7 | 1 | -2 | 2 | | | | | | | |
| | G | | | | | | -3 | 3 | 4 | -5 | 5 | +5 | 6 | -7 | 7 | 1 | -2 | 2 | | | | | | |
| | Ab | | | | | | | -3 | 3 | 4 | -5 | 5 | +5 | 6 | -7 | 7 | 1 | -2 | 2 | | | | | |
| | A | | | | | | | | -3 | 3 | 4 | -5 | 5 | +5 | 6 | -7 | 7 | 1 | -2 | 2 | | | | |
| | Bb | | | | | | | | | -3 | 3 | 4 | -5 | 5 | +5 | 6 | -7 | 7 | 1 | -2 | 2 | | | |
| | B | | | | | | | | | | -3 | 3 | 4 | -5 | 5 | +5 | 6 | -7 | 7 | 1 | -2 | 2 | | |
| 2nd INVERSION | C | | | | | | | -5 | 5 | +5 | 6 | -7 | 7 | 1 | -2 | 2 | -3 | 3 | 4 | | | | | |
| | C# | | | | | | | | -5 | 5 | +5 | 6 | -7 | 7 | 1 | -2 | 2 | -3 | 3 | 4 | | | | |
| | D | | | | | | | | | -5 | 5 | +5 | 6 | -7 | 7 | 1 | -2 | 2 | -3 | 3 | 4 | | | |
| | Eb | | | | | | | | | | -5 | 5 | +5 | 6 | -7 | 7 | 1 | -2 | 2 | -3 | 3 | 4 | | |
| | E | | | | | | | | | | | -5 | 5 | +5 | 6 | -7 | 7 | 1 | -2 | 2 | -3 | 3 | 4 | |
| | F | | | | | | | | | | | | -5 | 5 | +5 | 6 | -7 | 7 | 1 | -2 | 2 | -3 | 3 | 4 |
| | F# | | | | | | | | | | | | | -5 | 5 | +5 | 6 | -7 | 7 | 1 | -2 | 2 | -3 | 3 |
| | G | | | | | | | | | | | | | | -5 | 5 | +5 | 6 | -7 | 7 | 1 | -2 | 2 | -3 |
| | Ab | | | | | | | | | | | | | | | -5 | 5 | +5 | 6 | -7 | 7 | 1 | -2 | 2 |
| | A | | | | | | | | | | | | | | | | -5 | 5 | +5 | 6 | -7 | 7 | 1 | -2 |
| | Bb | | | | | | | | | | | | | | | | | -5 | 5 | +5 | 6 | -7 | 7 | 1 |
| | B | -5 | 5 | +5 | 6 | -7 | 7 | 1 | -2 | 2 | -3 | 3 | 4 | | | | | | | | | | | |

FIG.5

ELECTRONIC MUSICAL CHORD CALCULATOR

The invention relates to musical chord calculators and aims particularly to provide electronic circuitry therefor that is suitable for compact embodiment, at present in the so-called "integrated" or "silicon chip" semiconductor form.

It is evident that musical chord calculators require predetermined responses to be made between selection means that specify the desired chord and indicating means that demonstrate the specified chord. A general system for this purpose has a plurality of individually operable devices for chord specifying purposes, a plurality of individually energisable indicators one for each available musical note, and a selection network between said devices and said indicators. Many prior known musical chord calculators tend to be bulky and consume considerable electrical power by reason of the complex electronics required, both factors that have militated against embodiment as a readily portable hand-held instrument or as an easily accommodated part of a musical instrument itself. Other prior proposed systems simply look up stored words specifying each available chord and thus require a large storage capacity.

Accordingly we now propose herein that the chord specifying devices are in two groups. One group corresponds to each note for which a chord or chords is or are to be indicated and, automatically at operation of each device thereof, produces an indication of a particular chord, usually a simple basic chord and preferably the major triad. The other group corresponds to other chords and, automatically at operation of each device thereof, produces a change in the displayed chord effectively by addition or subtraction of a note or notes therefrom including sharpening and flattening notes originally present.

Suitable note and chord specifying devices comprise switches, satisfactorily of single-pole/single-throw type, and conveniently of push-button or touch-sensitive form, and may be in a multiple row or matrix-like arrangement as a panel therefor that could be part of a hand-held device reminiscent of the conventional electronic calculators that have now become so popular, or could be on a musical instrument as a panel, or even distributed to or adjacent its individual keys if the consequent loss of immediate device/printed circuitry relationship is tolerable, at least for the first group.

Suitable indicators may be of an electronic nature, such as light-emitting diode or liquid-crystal type and either a composite panel-like array as an indication of keys, stops, frets or the like on a hand-held device or a musical instrument; or distributed to or adjacent actual keys, stops, frets or the like of a musical instrument.

Turning now to preferred logic-type selection networks of miniaturised electronic type, utilising suitable available technology, such as semi-conductor CMOS, a compact, preferably single-chip, embodiment is desired for connection to the chord specifying devices that, for convenience, are called a keyboard, and to the indicators that, for convenience, are called a display.

In a first embodiment, the selection logic network employs logic gates in connections from the chord specifying devices of each group to the indicators. There may be individual sets of such connections and logic gates, one set for each selectable note. Alternatively, there may be, effectively, a single such set of connections for one note and a further logic circuitry for modifying outputs accordingly for other notes, such further logic circuitry including at least shift register means. Providing for display of inversions is then achievable using a further set or sets of connections and logic gates.

In a second embodiment the logic selection network has a first logic system responsive to chord selection for determining which notes (again including sharps and flats) are required relative to the tonic, and a second logic system responsive to note selection (also again including sharps and flats) and to output from the first logic system for placing the required notes relative to the display. Inversions are conveniently provided for by a third logic system between the first and second logic systems for suitably modifying the output of the first logic system as an input to the second logic system.

In a third embodiment, all information on chords and inversions is stored in a ROM for one note and then subjected to shifts according to which note is actually selected. At least then, any chords for which representation is disputed or invalied (e.g. some third inversions) can readily be indicated as such and according to outputs from the selection devices.

Practical implementation of the invention will now be described by way of example, with reference to the accompanying drawings, in which:

FIGS. 1, 2 and 3 show keyboard lay outs, respectively;

FIGS. 4 and 5 show tables of basic chord variants and inversions respectively; and FIGS. 6, 7 and 8 show schematic diagrams for selection logic networks, respectively.

In FIGS. 1, 2 and 3 a casing 10A, 10B, 10C has mounted for sight through and operative therein a display device 11A, 11B, 11C shown as a portion of a piano-type keyboard. Each key or note thereof (e.g. 12A, 12B, 12C) comprises an individually selectable indicator, preferably as a component of a liquid crystal display, through light emitting diodes or other suitable indicators/illuminators could be used if desired. The casing also houses push-button or touch-sensitive keys organised into groups for notes 13A, 13B, 13C and chords 14A, 14B, 14C all marked according to appropriate numerical rotation. It will, however, be noted that FIGS. 1 and 2 show all twelve notes for a scale inclusive of accepted sharps and flats, whereas FIG. 3 shows only natural notes plus sharp and flat keys. Also, FIG. 2 shows keys 15B for two chord inversions, whereas FIG. 3 shows a single inversion key 15C that is intended to be operative on a sequential basis to move from first to second even third inversions. All casings 10 have a clear or reset key 16A, 16B, 16C and an ON/OFF key 17A, 17B, 17C. Moreover, FIGS. 1 and 2 show a full set of fourteen chord variants, whereas FIG. 3 shows only eight chord selection keys, though sequential operation of the scale 6th, 7th and 9th keys and the augmented, dimminished, major and minor keys give satisfactory range of variations.

The table of FIG. 4 shows, relative to the major triad as a basic chord, what notes are added or subtracted for the chords in respect of which selection keys are shown in FIGS. 1 and 2. The table of FIG. 5 shows root positions and first and second inversions relative to actual notes required to be displayed by any combination of key operations, inversions, of course, apply only to FIGS. 2 and 3. In operation, it is intended that selection of a note key 13, if necessary also selection of the sharp or flat key (FIG. 3), will result automatically in display of the major triad as the basic chord relative to which these embodiments are described. Subsequent selection of a chord key 14 or inversion key 15 will result in change of the display correspondingly.

It will be appreciated that variant features of the key arrangements of FIGS. 1 to 3 may be present in other combinations than those shown. Also, tables could be set up relative to a basic chord other than the major triad.

Figure 6:
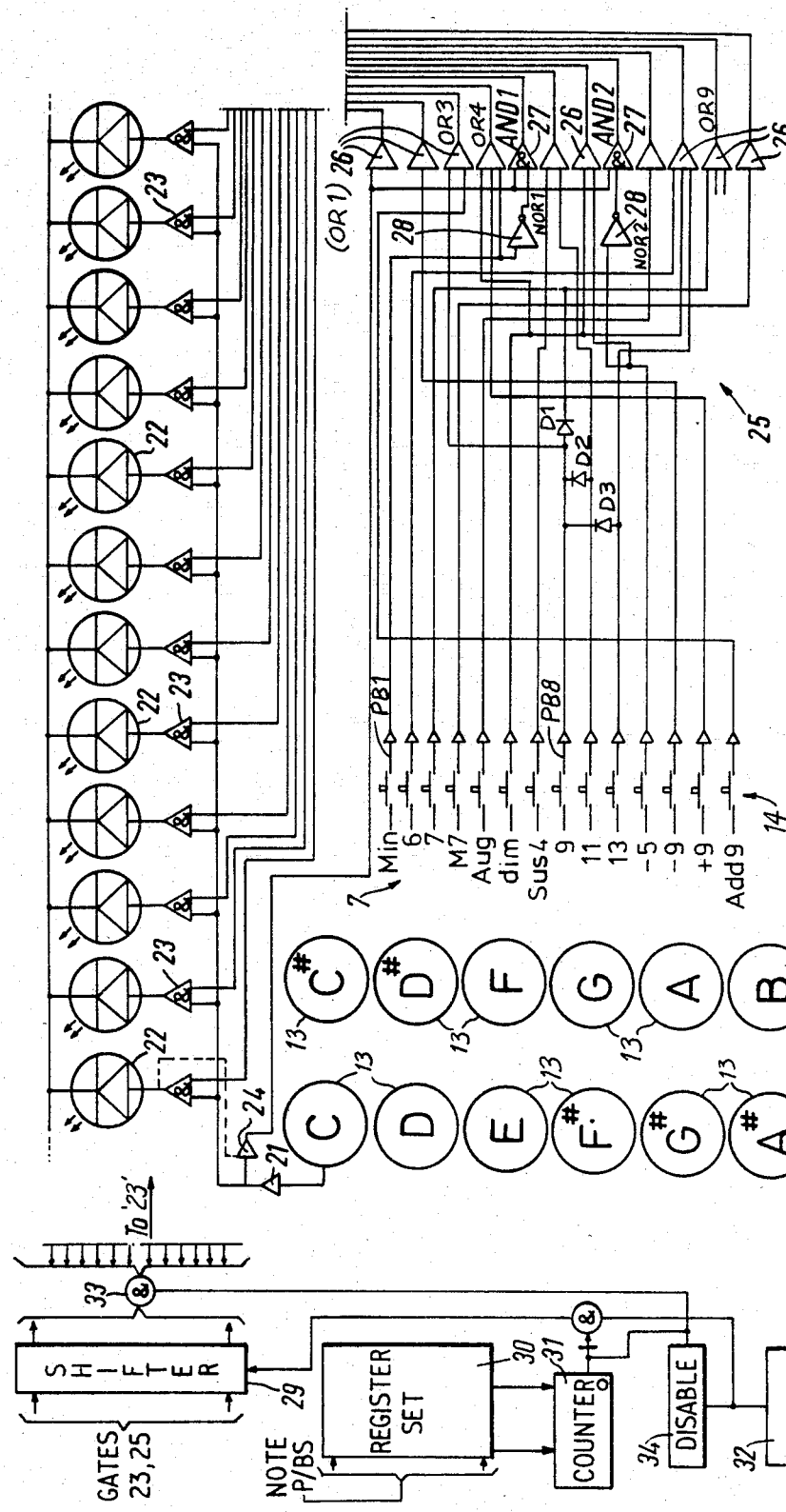

In the simple embodiment of logic selection circuitry of FIG. 6 using coincidence gates, each key is associated with a basic chord and connected via a latch 21 to each one of twelve light indicators 22 via an AND gate 23 and also to selected ones representing the notes of the chord concerned, via a buffer amplifier 24. The connection of only one key of a basic chord, namely, chord C is shown. Accordingly, only one set of AND gates is shown; it being understood that each light indicator could be connected to an AND gate for each of the keys of a basic chord, i.e. in total connected to twelve AND gates, or that a suitable commoning system, say using OR gates from the note selection keys, could be employed relative to a single set of AND gates 23.

The AND gate 23, set of AND gates 23, 25 for each light indicator is also connected to each of the keys provided for the chord variants via the gating logic generally indicated at 25 and comprising ten OR gates 26, two AND gates 27 and two NOR gates 28.

As will be evident from the above, the light indicators cover a total of twelve notes, but it will be understood that more could be used. For instance, it would be practicable to cover five octaves.

In operation, the user presses the key relating to the chord the finger positions of which on the fingerboard he wishes to know and this will then illuminate the respective light emitting diodes indicating the required finger positions on the fingerboard. Thus, if the user wishes to indicate the finger positions of the major triad of the note C represented by the notes C, E and G he would press the respective press button. Pressing the button completes a circuit to operate the respective latch and this applies one input to each of the AND gates associated with the light indicators. The signal from the latch is also amplified through the respective buffer amplifier to provide an input to a first of the OR gates, OR1, the first of the AND gates, AND1, and the second of the AND gates, AND2, thus providing a second input to each of the AND gates of the first, fifth and eight light indicator. In this instance these indicators correspond to the notes C, E and G of the scale of C; the twelve indicators respectively representing the notes C, C sharp, D, D sharp, E, F, F sharp, G, G sharp, A, A sharp, and B. The circuit may also be arranged simultaneously to display an inversion of the chord.

If the user now wishes to show the minor chord in the same scale, he would then additionally press the first variant key PB1. This will provide an input to the fourth of the OR gates, OR4, to illuminate the fourth light indicator and also via NOR gate NOR1 to disable the first AND gate AND1 to extinguish the fifth light indicator. The notes now displayed are C, D sharp (or E flat) and G these notes representing the chord of C minor. Alternatively, if the user wishes to show a dominant 9th chord, he would press key PB8, which would provide an input to the third OR gate OR3 to provide the ninth i.e. the note of D, and also an input to the 9th OR gate via diode D1 to provide the note of A sharp. Similarly, the other chord variants may be displayed, the further diodes D2, D3 steering the signals appropriately when the respective buttons are pressed.

The illustrated embodiment is suitable for making up with micro circuitry as a pocket device as shown generally in FIG. 1.

However, it is equally feasible for employment on the fingerboard etc., of an actual musical instrument to indicate the actual finger position for any given chord.

Reverting to FIG. 1, it is, of course, possible for there to be a different set of circuitry 21 to 28 for each note, i.e. each of the twelve keys 13. However, it is also feasible for a single set to be used plus a shift register for its outputs, see left side indication 29. Then, a set of registers 30 could serve for accessing by the keys 13 of contents representing desired shifts applied to a counter 31 that is automatically decremented by a timer 32, forming part of the normal requirements of any logic system such as that shown generally, after an appropriate delay for operation of the gates 23, 25. Output from the shift register is then conveniently enabled at 33 by zero state of the counter 31.

Figure 7:
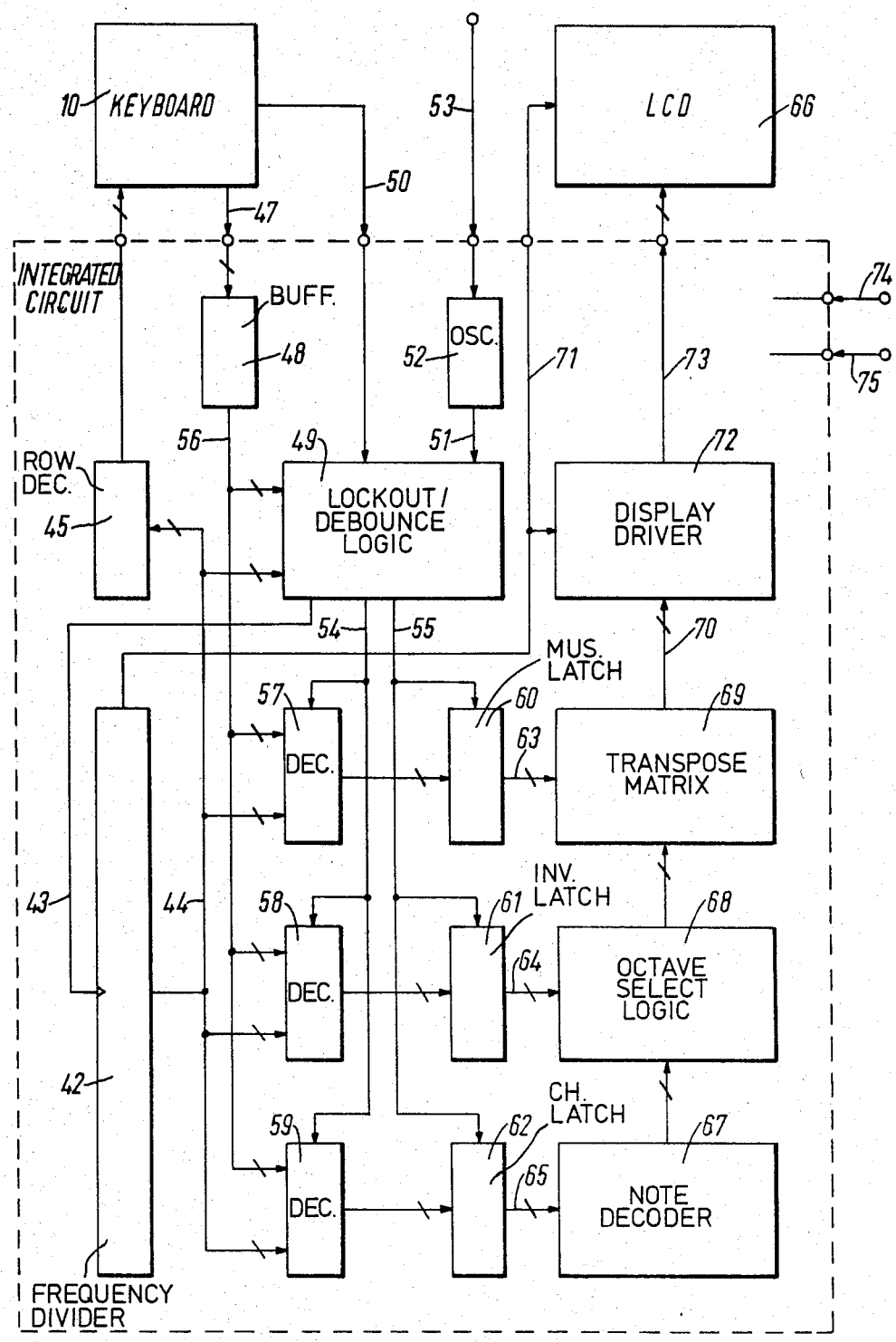

The embodiment of FIG. 7 comprises a combination of keyboard interface logic 42-56, decoding logic 57-70 and display drivers 71-73.

The keyboard interface logic comprises a divider 42 which divides the frequency (typically 1 KHz) of a clock signal 43. The three-bit wide divider output 44 is passed to a keybaord row decoder 45. If a key is pressed on the keyboard, it will be detected in the five-bit wide column output data 47. The column output data 47 is buffered by a column output data buffer 48 whose output 56 is passed to lockout/debounce logic 49 which inhibits a second keypress from being detected whilst the first keypress is maintained. Other signal inputs to the lockout/debounce logic 49 are clear/reset 50 from the keyboard, the three-bit wide divider output 44 and input clock 51 which is derived from an oscillator 52. The frequency of oscillation is determined by the value of an external capacitor (not shown) connected to the appropriate terminal 53. Outputs from the lockout/debounce logic 49 are clock signal 43 to the divider 42, keypress detect 54 and latch reset 55.

The decode logic derives its data from the buffered column output data 56, the three-bit wide divider output 44 and keypress detect 54. Although the keyboard is being constantly scanned by the keyboard row decoder 45, the decode logic 57, 58, 59 only responds when a key has been pressed. This information is held on keypress detect input 54. The keypress detect signal 54 is sychronous with the appropriate state of the divider output 44 so that the divider output 44 and the buffered column output data 56 may be readily decoded and the key which has been pressed identified. The decoder is comprised of three basic sections—musical key decode 57, inversion decode 58 and chord decode 59. The data from these decoders 57, 58, 59 is latched by musical key latch 60, inversion latch 61 and chord latch 62 respectively.

In accordance with a preferred embodiment of the invention, twelve outputs 63 will be present at the output of the musical key latch 60 representing the musical keys C, C♯, D etc. to B inclusive. Two outputs 64 will be present at the output of the inversion latch 61 representing 1st chord inversion and 2nd chord inversion, the root position being implied by default. Fourteen outputs 65 will be present at the output of the chord latch 62 representing the musical chords and added notes given in the table of FIG. 4.

Further decoding is required of the outputs 63, 64, 65 in order to determine which elements of the external liquid crystal display (LCD) 66 are to be activated. The note decoder 67 fulfils the function of the table of FIG. 4 and determines which notes, related to the tonic, are to be activated. Octave select logic 68 and transpose matrix 69 fulfil the function of the table of FIG. 5, using the outputs of the note decoder 67, inversion outputs 64 and musical key outputs 63.

Thus, the standardised note positions (relative to the basic chord) forming the output of the decoder 67 will be subject, according to the note key operated, to modification in the transpose matrix 69 in order to "place" those standardised note in positions on the display (effectively the matrix outputs 70) appropriate to the note concerned. If an inversion key is operated, the outputs of the decoder 67 will be subject to appropriate modification prior to amplication to the transpose matrix 69. The transpose matrix conveniently comprises circuitry known as a barrel store.

In a preferred embodiment of the invention, twenty three outputs 70 are present at the output of the transpose matrix 69.

It will be appreciated that the aforementioned transpersing systems, whether by way of shift register or rolling matrix stores, make it possible to implement this invention effectively by limiting the logic selection network to shift operations, say with octave adjustments where a required shift operation would otherwise take the chord notes beyond the display portion. Thus, a store, conveniently of ROM semiconductor type, can be loaded with chord variant information for a particular note. Such a store will be addressed by the chord variant keys, also the inversion key or keys where desired. The resulting store output will then be shifted in accordance with the note key and replace the basic chord appearing automatically for that note key. Generally, of course, the additional logic required in order to translate or generate shift displacements can be along the lines of what is shown dashed for FIG. 6.

Thus one operative configuration is shown in FIG. 8 using a ROM store 80 addressed at least by chord key signals on lines 81. Outputs 82 from the store represent chords for a given note, say C or F and are sent to a shifting circuit 83. The note key lines 84 are shown going to a shift translator 85 to give the desired shift for any note. The shift translator may be a simple store and thus part of the store 80, if desired, hence showing lines 84 applied to the store 80. Any desired logic may, however, be added to the shift translator, even responsive to inversions, or detection of shift going beyond display to change the shift by an octave, or applying single semitone shifts of appropriate direction directly to the shift register 83, etc. Outputs 86 from the shift specifier 85 are shown applied to a decrementing counter 87 driven by clock pulses from a suitable source 88 via a disable gate 89. Thus, the counter output will also, see 90, drive the shift register until the counter reaches its zero state when line 91 disables the gate 89 and enables output, see 92 from the shifter 83 to the display. Resetting of the disable gate 89 and/or the counter 87 is readily provided for.

One overview of the invention is as an electronic musical chord calculator comprising a plurality of finger-actuatable devices some of which correspond to musical notes and others of which correspond to chords and all of which produce demand signals when activated, indicator means having a plurality of devices or parts each corresponding to different notes so as to display any chord specifiable by said finger-actuatable devices, means responsive to said demand signals for immediately producing first signals representative of certain chords, and means also responsive to said demand signals for performing logic operations upon the first signals to modify same and produce second signals representative of specified chords that are different from said certain chords, and supplying those second signals to the indicator means and generally as in the attached claims.

I claim:

1. An electronic musical chord calculator comprising:
   (a) a plurality of finger-actuatable devices, some of which correspond to musical notes and other of which correspond to chords and all of which each produce a demand signal when activated,
   (b) indicator means having a plurality of devices or parts, each corresponding to different notes so as to display any chord specifiable by said finger-actuatable devices,
   (c) means responsive to said demand signal from a selected said finger-actuatable device corresponding to a note for immediately producing first signals for the indicator means and representative of a certain predetermined chord for that note,
   (d) logic means, and
   (e) means then responsive to said demand signal from a selected said finger-actuatable device corresponding to a chord for operating said logic means to replace said first signals with relatively modified second signals as inputs to said indicator means representative of the selected chords.

2. An electronic musical chord calculator according to claim 1, wherein the means for producing the first and second signals include coincidence logic gates receiving inputs from the finger-actuatable devices specifying said one note and any desired chord.

3. An electronic musical chord calculator according to claim 1, wherein each of said some finger-actuatable devices has its own set of logic circuitry associated therewith for immediate display of the relevant basic chord constituting said certain chord and subsequent display of other chords produced by modifying the basic chord.

4. An electronic musical chord calculator according to claim 1, wherein the logic means includes means for making shifts of the second signals relative to the indicator devices according to which of said some finger-actuatable devices is selected.

5. An electronic musical chord calculator according to claim 1, comprising a first logic network responsive to demand signals from any one of said other finger-actuatable devices for producing signals representing notes to be added, subtracted, sharpened or flattened relative to the certain chord for any musical note, and transpose matrix circuitry for producing said second signals from outputs from the first logic network and note-specifying signals.

6. An electronic musical chord calculator according to claim 5, comprising a second logic network between the first logic network and the transpose matrix, and responsive to signals from finger-actuatable devices for specifying inversions.

7. An electronic musical chord calculator according to claim 1, further including a store addressable by said demand signals wherein the certain and other chords for said one note are all in said store addressable by said demand signals, and the logic means is responsive to note demand signals for producing chords for other notes from outputs of said store.

8. An electronic musical chord calculator according to claim 1, further including a hand-held casing visibly housing the indicator means and containing all other said means, said finger-actuatable devices being on said casing.

9. An electronic musical chord calculator according to claim 8, wherein the indicator means comprises a representation of part of a piano keyboard.

10. An electronic musical chord calculator according to claim 1, wherein the basic chord is the major triad.

11. An electronic musical chord calculator according to claim 2, wherein the basic chord is the major triad.

12. An electronic musical chord calculator according to claim 3, wherein the basic chord is the major triad.

13. An electronic musical chord calculator according to claim 4, wherein the basic chord is the major triad.

14. An electronic musical chord calculator according to claim 5, wherein the basic chord is the major triad.

15. An electronic musical chord calculator according to claim 6, wherein the basic chord is the major triad.

16. An electronic musical chord calculator according to claim 7, wherein the basic chord is the major triad.

17. An electronic musical chord calculator according to claim 8, wherein the basic chord is the major triad.

18. An electronic musical chord calculator according to claim 9, wherein the basic chord is the major triad.

* * * * *